US006462924B1

(12) United States Patent
Watanabe et al.

(10) Patent No.: US 6,462,924 B1
(45) Date of Patent: Oct. 8, 2002

(54) POWER SUPPLY APPARATUS COMPRISING A VOLTAGE DETECTION CIRCUIT AND METHOD FOR USING SAME

(75) Inventors: Masahiro Watanabe, Hitachi; Kazuo Kato, Mito; Kenji Ogawa, Hitachi; Isao Ueno, Hitachiohta, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/940,793

(22) Filed: Aug. 29, 2001

(30) Foreign Application Priority Data

Feb. 26, 2001 (JP) .......................... 2001-051259

(51) Int. Cl.[7] .................................. H02H 3/20
(52) U.S. Cl. ...................................... 361/91.2
(58) Field of Search .................... 323/358; 363/86, 363/52, 53, 125, 126, 127; 361/18, 91.1, 91.2

(56) References Cited

U.S. PATENT DOCUMENTS 3,731,148 A * 5/1973 Fournis ...................... 361/45
3,848,159 A * 11/1974 Nye et al. ................... 361/45
4,241,373 A * 12/1980 Mara et al. ................. 324/126
6,160,697 A * 12/2000 Edel ........................... 361/143

FOREIGN PATENT DOCUMENTS

JP          11-341809           10/1999

* cited by examiner

Primary Examiner—Shawn Riley
(74) Attorney, Agent, or Firm—Dickstein Shapiro Morin & Oshinsky LLP

(57) ABSTRACT

A power supply apparatus is disclosed comprising a voltage detection circuit connected to a smoothing circuit and an AC switch having a low ON-resistance with no offset voltage at current-buildup. The AC switch is further connected to a secondary winding of a current transformer. When an output voltage of the smoothing circuit increases up to a predetermined value, the output voltage is detected by the voltage detection circuit and the AC switch is turned on by an output signal of the voltage detection circuit, whereby the secondary winding of the current transformer is short-circuited.

56 Claims, 5 Drawing Sheets

POWER SUPPLY APPARATUS COMPRISING A VOLTAGE DETECTION CIRCUIT AND METHOD FOR USING SAME

FIELD OF THE INVENTION

The present invention relates to a power supply apparatus and to a method for controlling current utilizing the apparatus.

DISCUSSION OF THE RELATED ART

For a small capacity power supply apparatus for supplying DC power to electronic apparatuses, such as a sensor for transmission or distribution of electrical energy, a through-type current transformer has been used, which allows clipping the primary side on the main circuit to obtain electrical energy from a strong current circuit (main circuit) without requiring electric work. Also, a DC power supply apparatus of a current transformer input type has been widely used which has a configuration in which the primary side is clipped on the main circuit and the voltage generated in the secondary winding is rectified and smoothed to output a DC voltage.

In the case of a DC power supply apparatus of a current transformer input type as mentioned above, the winding ratio of a current transformer is needed to be able to supply a sufficient load current even at the minimum main circuit current. But, when dealing with transmission or distribution of electric energy, it is desirable to design the dynamic range of the main circuit current as wide as possible. Therefore, the change or increment exceeding the minimum main circuit current becomes an excess input to the current transformer, resulting in circuit loss in the power supply circuit. For example, if the dynamic range of the primary current (main circuit current) is designed to be 10 to 100 A, then when input current is 100 A, in the secondary side 90 A is excess power, which increases the loss of current and heat. Since the output voltage of the power supply apparatus is usually required to be constant in the load side, a circuit on the secondary winding of the current transformer has to bear the large product of VA at excess input. In other words, the current transformer has to be made large to compensate for the increased VA.

Conventionally, in order to decrease the loss in the secondary winding of the current transformer in the case of an excess current, the excess current state is detected by monitoring the rectified current and smoothed output on the secondary side is provided. Then, the secondary winding is short-circuited with the use of an AC switch like a Triac (triode AC switch) by utilizing a synchronous rectifier circuit of a low loss with the use of a field effect transistor.

However, an AC switch like Triac, has a PNPN junction, so that at the time of short circuit, a voltage drop for 2 diodes is generated and the loss becomes large. Also, the control circuit for the AC switch is complicated and costly. Also, a synchronous rectifier switch with the use of a field effect transistor has drawbacks as well. For instance, if a field effect transistor having a very small ON-resistance is used in the rectifier portion or in the AC switch in order to make the loss small, the secondary winding voltage necessary to drive the synchronous rectification also becomes small when short-circuiting. Therefore, it is difficult to realize a synchronous rectifier with high efficiency. In both cases, the circuit losses are not controlled sufficiently and a small sized current transformer is not realized.

SUMMARY OF THE INVENTION

The present invention provides a power supply apparatus of a current transformer input type having a small circuit loss and a wide input dynamic range. Also, the present invention provides a small sized power supply apparatus which can be clipped on the main circuit (live line).

In an object of the present invention an AC switch which is used to short-circuit the secondary side of a current transformer, is constituted with a switch having no offset voltage at the buildup of a current and has a low ON-resistance. The AC switch can preferably be constituted with a field effect transistor (MOS). A control signal for this AC switch uses accumulated charges in a smoothing circuit on the side of a DC power supply. When the output power of a secondary winding of a current transformer exceeds the necessary VA for the DC power supply (at the time of an excess input), the secondary winding of the current transformer is short-circuited with the AC switch allowing any excess input to be controlled and circuit loss to be decreased.

BRIEF DESCRIPTION OF THE DRAWINGS

The above advantages and features of the invention will be more clearly understood from the following detailed description which is provided in connection with the accompanying drawings.

DETAILED DESCRIPTION OF THE INVENTION

Exemplary embodiment of the present invention will be described below in connection with the drawings. Other embodiments may be utilized and structural or logical changes may be made without departing from the spirit or scope of the present invention. Like items are referred to by like reference numerals throughout the drawings.

Figure 1:
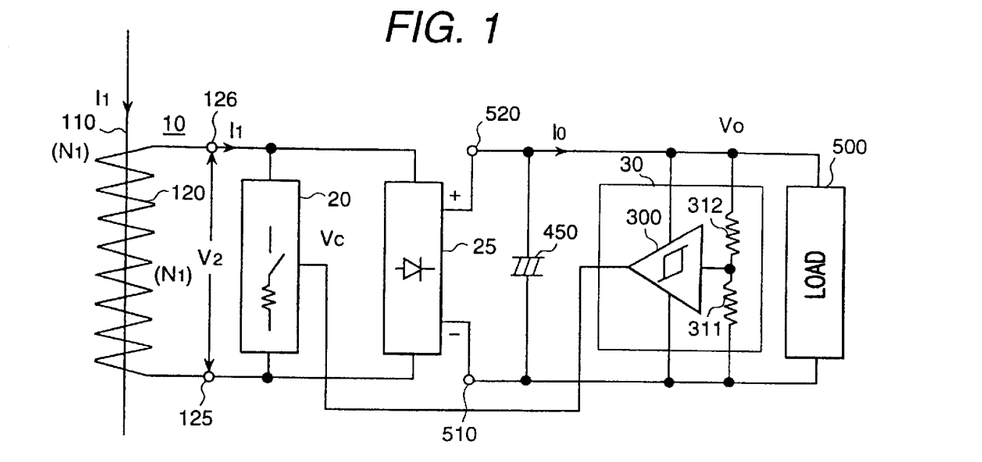
FIG. 1 illustrates the constitution of a DC power supply apparatus of a current transformer according to the present invention.

Referring now to the drawings, FIG. 1 illustrates the configuration of a DC power supply apparatus according to the present invention. As shown in FIG. 1, a current transformer 10 is provided with a through-type-primary conductor (winding) 110 and a secondary winding 120. An AC switch 20 using a switch which has no offset voltage at the buildup of a current and a low ON-resistance, and a rectifier circuit 25 are connected between terminals 125 and 126 of the secondary winding 120. A capacitor 450 having a large capacitance which serves as a smoothing circuit, a voltage detection circuit 30 which has a hysteresis characteristic and is operated by the capacitor 450 as a DC power supply, and a load 500 are connected between output terminals 510 and 520 of the rectifier circuit 25.

The output signal of the voltage detection circuit 30 is supplied to a control terminal of the AC switch 20 as a control voltage Vs. which makes the switch operate ON/OFF. The voltage detection circuit 30 is provided with resistors 311 and 312 for dividing the output voltage Vo, and a hysteresis comparator 300, and is set to control the ON/OFF control voltage Vs. using allowable upper and lower limit output voltages VH and VL for the load 500 as set voltages.

Figure 2:
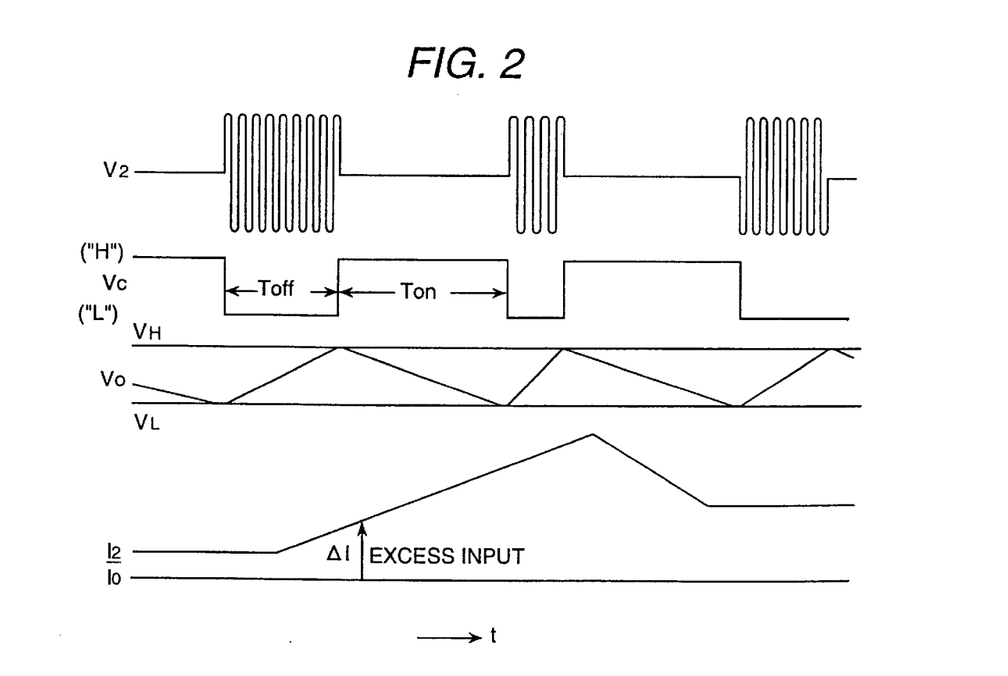
FIG. 2 shows an operation characteristics chart of the DC power supply apparatus of a power supply apparatus shown in FIG. 1.

FIG. 2 shows operating characteristics of a DC power supply apparatus constituted as mentioned in the above. The rectifier circuit 25 rectifies a secondary winding voltage V2 generated in the secondary winding 120 based on a current I1 which flows through a primary conductor 110 of the current transformer 10, and the capacitor 450 smoothes out the rectified voltage and supplies the output voltage Vo to the load 500.

The average value of a secondary winding current I2 of the current transformer is changed from I0 to I2av, and the DC load current is set as Io. Assuming that Io<I2av, the difference ΔI between the two currents expresses the excess input for the power supply apparatus. Since this excess input ΔI is accumulated in the capacitor 450, the output voltage Vo increases during the Toff period of ON/OFF control voltage Vs. When the output voltage Vo increases up to the upper limit value VH, the voltage detection circuit 30 detects this and makes the ON/OFF control voltage Vs. be "H" level (Ton period), and makes the AC switch 20 ON to short-circuit the secondary winding 120 of the current transformer 10. As a result, during the Ton period, the secondary winding voltage V2 of the current transformer 10 becomes zero, the applied load is substantially null, and the circuit loss becomes only $I^2R$ in the short-circuiting circuit, including the resistance of the secondary winding 120.

During the Ton period, that is, while the secondary winding 120 is short-circuited, the input to the rectifier circuit 25 is zero and a DC side load current Io is supplied by the discharge of the accumulated charge in the capacitor 450. Therefore, the terminal voltage of the capacitor 450 (output voltage Vo) decreases. When the output voltage Vo decreases up to the set lower limit voltage VL, the voltage detection circuit 30 makes the ON/OFF control voltage Vs. change to the "L" level. Hence, the AC switch 20 is turned off, and the secondary winding voltage V2 of the current transformer 10 is supplied again to the rectifier circuit 25. Thus, the capacitor 450 is charged up again by the rectified output of the rectifier circuit 25 to increase the terminal voltage (output voltage Vo). In the same way, the ON/OFF's of the AC switch 20 are repeated, and the output voltage Vo is kept in a predetermined range (between VH and VL).

The switching period of the AC switch 20 depends on the DC side load current Io, the secondary winding current I2 of the current transformer 10, the capacity of the capacitor 450, the hysteresis width of the voltage detection circuit 30 (VH to VL) and the like, and it does not depend on the frequency of the power supply. But, Ton and Toff periods will be determined to be longer than the period of the power supply frequency by the proper selection of the capacity of the capacitance 450. For example, a capacitor of several hundreds of μF may be selected for a DC power supply apparatus whose DC side load current Io is several tens of mA.

This DC power supply apparatus has two distinctive characteristics. First, at the excess input, the secondary winding 120 of the current transformer 10 is immediately short-circuited with the use of an AC switch 20 which has no offset voltage at the buildup of a current and has a low ON-resistance. Second, for the ON/OFF control voltage Vs. for the AC switch 20, a control signal which is independent of the voltage or current of the current transformer 10 is used, whereby it is made possible to lengthen the control period. Owing to these distinctive characteristics, it is made possible to realize a DC power supply apparatus having lower loss than conventional equipment. The secondary side VA, which is important for the current transformer 10, becomes an AC converted value of the maximum DC output power VHIo added with the loss in the diode. The AC switch 20 is constituted with a switch which has no offset voltage at the buildup of a current and has a low ON-resistance. It is desirable that the ON-resistance as a switch is equal to or lower than the resistance of the secondary winding 120 of the current transformer. For example, it is in the range of about 2 mΩ to 10 mΩ. In one embodiment, a MOS field effect transistor, developed for a large current synchronous rectifier or a small sized button type mercury contact relay can be utilized. In the case of a mercury contact relay, the driving winding is insulated and the contact is non-polarized, so that it can be used as an AC switch. However, the MOS field effect transistor has a polarized contact and the driving circuit therefore is a non-insulated type.

Figure 3:
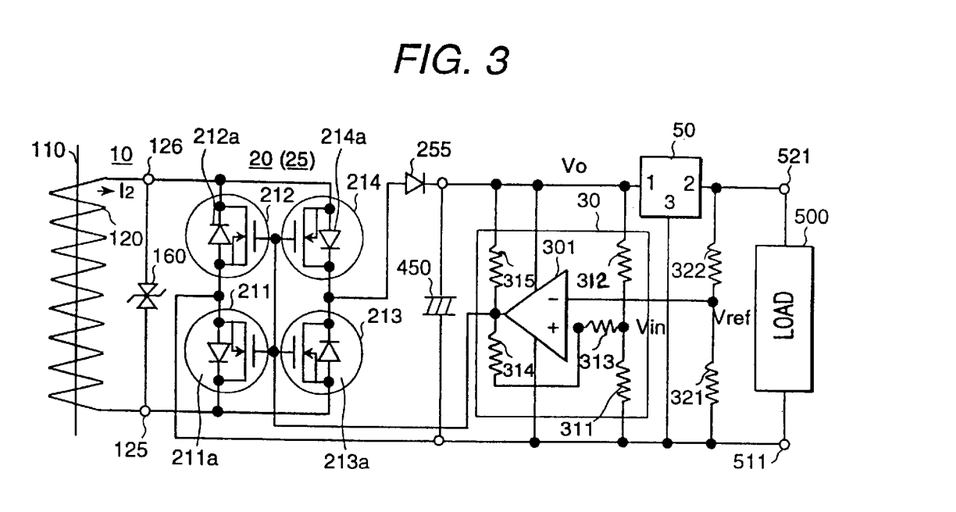
FIG. 3 illustrates an embodiment of a DC power supply apparatus according to the present invention.

FIG. 3 illustrates a DC power supply apparatus of a current transformer input type in which the AC switch 20 is constituted using MOS field effect transistors. The AC switch 20 is constituted with MOS field effect transistors 211 through 214 forming a bridge circuit, and parasitic diodes 211a through 214a in the MOS field effect transistors are utilized as a full-wave-bridge rectifier which constitutes a rectifier circuit 25. On the DC output side, in order that the voltage ripples generated by the ON/OFF of the AC switch 20 are smoothed out, the DC power is supplied to the load 500 through a three terminal type constant voltage power supply 50.

The voltage detection circuit 30 having a hysteresis characteristic forms a positive feedback circuit using a differential amplifier 301 and constitutes a voltage comparator of an irreversible type, and it does ON-operation at Vref<Vin·R313/(R313+R314)

and OFF-operation at

Vref<(Vo "L"–Vin)·R313/(R313+R314)+ Vin. When the output voltage of the three terminal type constant voltage power supply 50 is 5 V, ON/OFF operation voltages are set to operate at upper limit value 8 V and lower limit value 6 V.

A surge voltage suppression element 160 of both polarities is connected to the secondary winding 120 of the current transformer 10 for the suppression of a high speed surge voltage. The surge voltage suppression element 160 is a silicon oxide element and the threshold voltage is in the order of ±15 V in the case where the output voltage is as described in the above. A diode 255 is connected in series between the AC switch 20 and the capacitor 450 having a large capacitance. The diode 255 is provided to prevent the capacitor 450 from discharging through the AC switch 20 when the AC switch 20 is short-circuited. As an actual switch suitable for the AC switch 20 (MOS field effect transistors 211 through 214), Nch MOS field effect transistors (HAT2064R, maximum ON-resistance 10 mΩ made by Hitachi, Ltd.), which was developed for a synchronous rectification of a low voltage, large current switching power supply, can be used.

Figure 4:
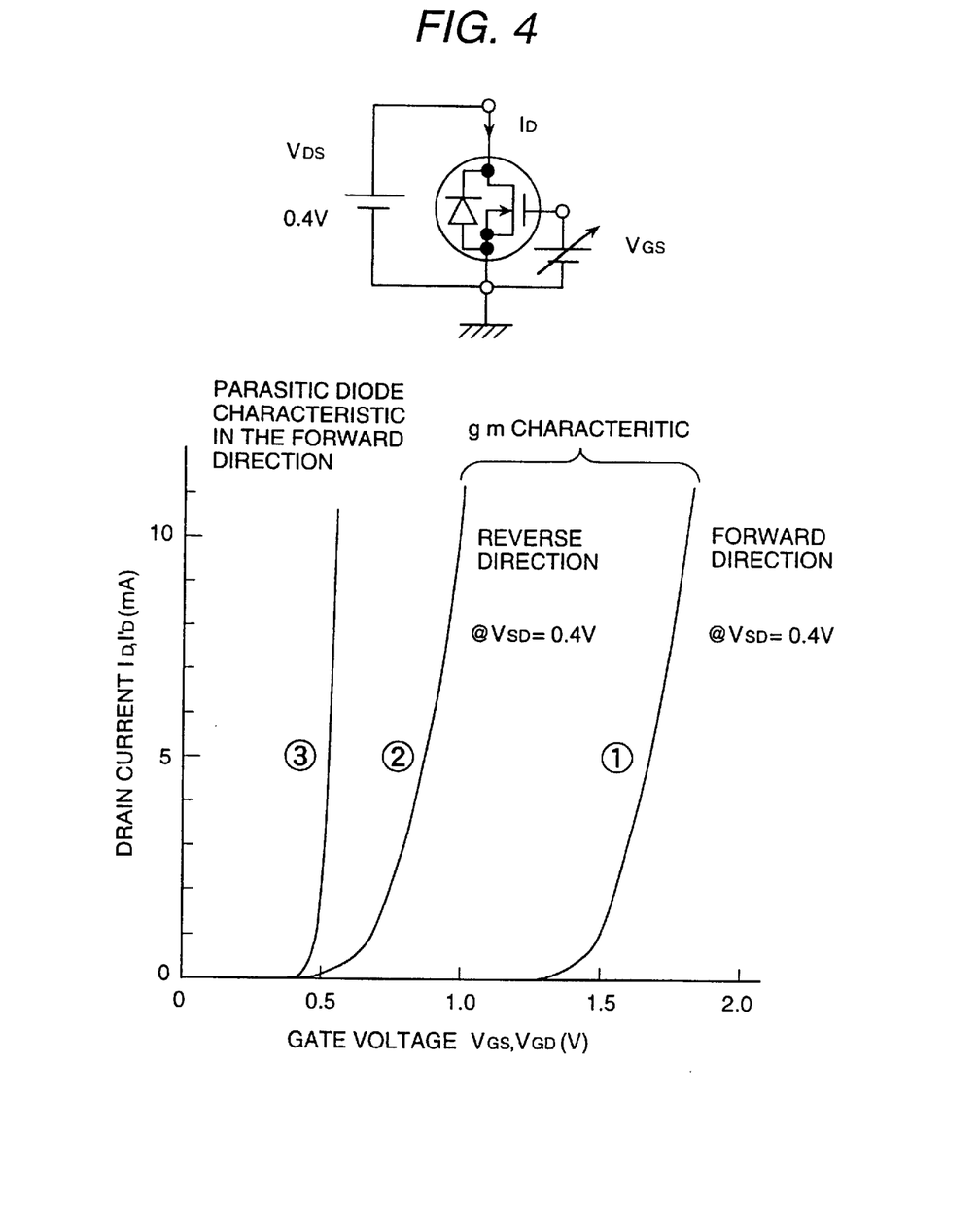
FIG. 4 illustrates the basic characteristics of a MOS field effect transistor used in the present invention.
Figure 5:
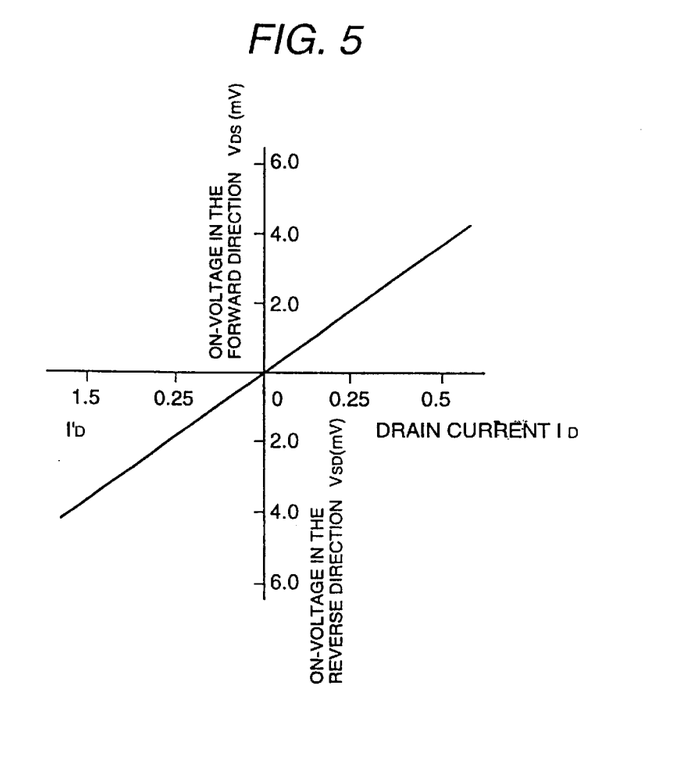
FIG. 5 illustrates the basic characteristics of a MOS field effect transistor used in the present invention.

In FIG. 4, the characteristics ① and ② show gm characteristics in the forward direction and the backward direction respectively in the low voltage range in which parasitic diodes do not operate, and the characteristic ③ shows that in the forward direction of the parasitic diode. FIG. 5 shows the ON-resistance characteristics in forward and backward directions in a case where the ON/OFF control voltage Vs. is assumed to be the minimum logical voltage level 4.5 V.

A DC power supply apparatus which is constituted as shown in FIG. 3 is operated as follows. When the secondary winding current I2 of the current transformer 10 is being supplied at the starting time and the voltage at a terminal 520 on the rectifier output side is low, the ON/OFF control voltage Vs. which is output from the voltage detection circuit 30 is in a "L" level, and the output voltage of the three terminal type constant voltage power supply 50 does not reach the predetermined value. Therefore, the switch portions of the MOS field effect transistors 211 through 214 of the AC switch 20 are in a n OFF state and the parasitic diodes 211a through 214a are being operated as a full-wave rectifier circuit.

When the capacitor 450 on the rectifier output side is gradually charged up, and the voltage at terminal 520 increases up to approximately 6 V, the three terminal type constant voltage power supply 50 supplies the output voltage Vo controlled to 5 V to the load 500. But, the ON/OFF control voltage Vs. output from the voltage detection circuit 30 is still in the "L" level and the respective MOS field effect transistors 211 through 214 of the AC switch 20 are kept OFF.

Next, when the voltage at the terminal 520 reaches 8 V, the ON/OFF control voltage Vs. output from the voltage detection circuit 30 becomes "H" level, respective MOS field effect transistors 211 through 214 are turned on, the terminals 125 and 126 of the secondary winding 120 of the current transformer 10 are short-circuited, and the supply voltage to the parasitic diodes 211a through 214a (bridge rectifier circuit 25) is completely cutout. Thus, the supply of the DC load current to the load 500 through the three terminal type constant voltage power supply 50 is performed by the discharge of the capacitor 450, so that the output voltage Vo at the terminal 520 drops from 8 V When the voltage Vo comes down to 6 V, the ON/OFF control voltage Vs. output from the voltage detection circuit 30 becomes "L" level, which makes the AC switch 20 turn OFF, and makes terminals of the secondary winding 120 of the current transformer 10 open and resumes the supply of current to the rectifier circuit 25. Next, the operation is repeated and the excess input from the current transformer 10 is controlled.

For the function of the AC switch 20, in the case of OFF signal (ON/OFF control voltage Vs. is in the "L" level), OFF state has to be kept irrespective of the polarity or the phase of the AC voltage generated between the terminals 125 and 126 of the secondary winding 120 of the current transformer 10. In the case of ON signal (ON/OFF control voltage Vs. is in the "H" level), ON state has to be kept. An ordinary power MOS field effect transistor is basically a DC switch. Like the circuit configuration and the circuit characteristics as shown in FIG. 4, parasitic diodes become conductive in a backward direction and they cannot block a current. Since the gm characteristics for a gate voltage are different, some devices are necessary to use them as the elements of the AC switch 20.

Therefore, as shown in FIG. 3, the two MOS field effect transistors 211 through 214 are connected in series in a reverse direction from each other for the AC voltage terminal to be ON/OFF operated. By this configuration, irrespective of the polarity or the phase of the AC voltage generated between the terminals, the OFF state is kept at an OFF gate period by all means. Since two MOS field effect transistors connected in series, irrespective of the polarity and the phase of the AC voltage, are satisfied for the conduction condition that the source or the drain voltage of one of the two field effect transistors is lower than the ON-gate voltage (in the case of n channel), in the period when the ON-gate voltage is applied, a field effect transistor of either one of which conduction condition is satisfied is turned on. Then (with a little delay) another field effect transistor also becomes conductive with its conductive condition satisfied. Thus, both field effect transistors become completely conductive.

In this way, in the AC switch 20 shown in FIG. 3, the MOS field effect transistors 211 and 212 having a common ON/OFF control voltage Vs. first becomes conductive and next, MOS transistors 213 and 214 become conductive. Note, the difference in time is very small and practically speaking, they are almost simultaneous in operation. The ON-resistance of the AC switch 20 can be considered to be that of one field effect transistor, so that from the data shown in FIG. 4, the ON-resistance can be considered in the order of 7 mΩ. But, the resistance of the secondary winding 120 of the current transformer 10 which is used in the DC power supply apparatus of a current transformer input type shown in FIG. 3 is 0.5 Ω for the maximum current 2A. There fore, the loss of I2R of the switch is only 28 mW and the loss inside the secondary winding 120 is 2 W Thus, the loss of the switch is smaller than the resistance loss in the secondary winding 120 of the current transformer 10.

Also, since the built-in parasitic diodes 211a through 214a in the MOS field effect transistors 211 through 214, which constitute the AC switch 20, form the full-wave rectifier 25, the circuit configuration is simplified and the rectification loss of a rectifier formed by these parasitic diodes 211a through 214a is, as shown in the characteristics ③ in FIG. 4, remarkably small in comparison with that of a rectifier formed by ordinary diodes, allowing miniaturization of the whole circuit configuration.

Figure 6:
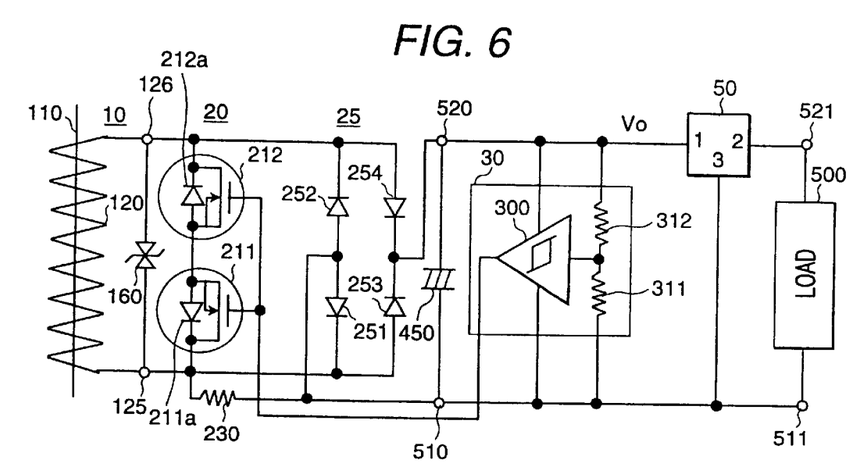
FIG. 6 illustrates another embodiment of a DC power supply apparatus of according to the present invention.

FIG. 6 illustrates another embodiment of a DC power supply apparatus according to the present invention. In the present embodiment, an AC switch 20 is constituted with two MOS field effect transistors 211 and 212. A rectifier circuit 25 is constituted with a diode-bridge circuit formed with diodes 251 through 254. Further, a resistor 230 is provided between the reference voltage side of the rectifier circuit 25 and the reference voltage side of the AC switch 20. The resistor 230 is a potential-equalizing resistor and its function is to align the potential of the signal voltage reference point of the AC switch 20, which can be unstable when the respective diodes 251 through 254 of the rectifier 25 are biased in the reverse direction by the voltage of the capacitor 450 to assume a cutoff state, with the potential (at the terminal 510) of the zero volt reference on the DC side which supplies ON/OFF control voltage. It may have the resistance in the range of 10 kΩ to 100 kΩ. The operation of the DC power supply apparatus in the present embodiment is almost identical to that of the DC power supply apparatus which is shown in FIGS. 1 and 3 and has been described in detail.

The present embodiment is advantageous in that the AC switch 20 can be constituted with two high performance MOS field effect transistors 211 and 212, and the rectifier circuit 25 is constituted with diodes 251 through 254 of small capacities, and the like. Hence, the DC power supply apparatus can be constituted at a lower cost in comparison with the cost for the previous embodiment.

Figure 7:
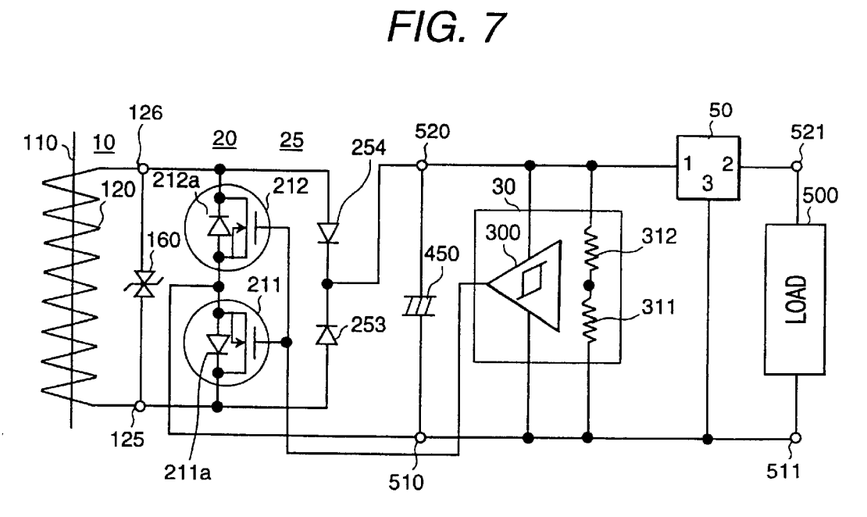
FIG. 7 illustrates further embodiment of a DC power supply apparatus according to the present invention.

FIG. 7 illustrates a further embodiment of a DC power supply apparatus of a current transformer input type according to the present invention. In the present embodiment, an AC switch 20 is constituted with two MOS field effect transistors 211 and 212. The rectifier circuit 25 is constituted with the parasitic diodes 211a and 212a of the above-mentioned two MOS field effect transistors 211 and 212 and diodes 253 and 254. Since, the control reference point of the AC switch 20, being a bridge circuit, is common with the DC circuit zero voltage, the potential equalizing resistor in the previous embodiment is not needed, and even when the AC switch 20 is turned on, the discharge of the capacitor 450 can be prevented by the diodes 253 and 254. Therefore, the discharge blocking diode connected in series is not needed and the voltage loss is decreased by that portion, providing the good efficiency, and the circuit configuration is simplified and good efficiency is obtained.

Figure 8:
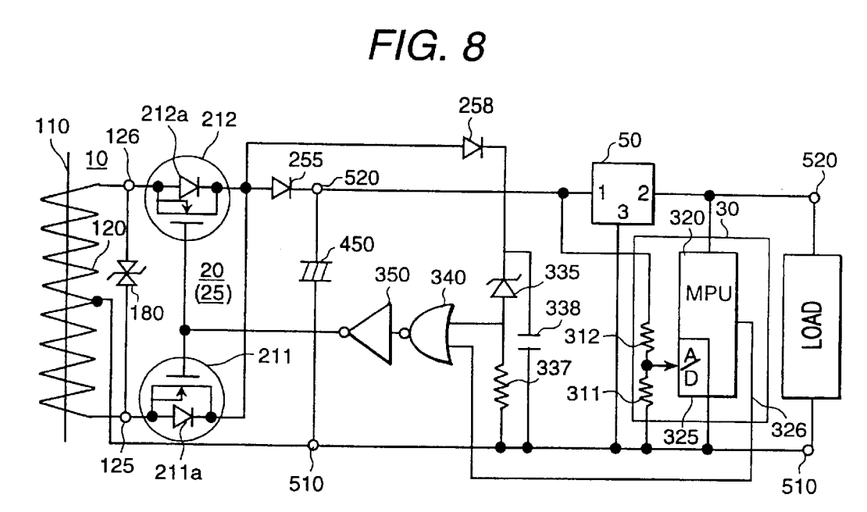
FIG. 8 illustrates yet another embodiment of a DC power supply apparatus of a current transformer input type according to the present invention.

FIG. 8 illustrates another embodiment of a DC power supply according to the present invention. In the present embodiment, the secondary winding 120 of the current transformer 10 is constituted to have a center tap, an AC switch 20 constitutes a short circuit switch of the secondary winding 120 with two MOS field effect transistors 211 and 212 connected in series in the opposite directions to each other and a rectifier circuit 25 with parasitic diodes 211a and 212a. A diode 255 functions to block the discharge of the capacitor 450 through the AC switch 20 at the time of short-circuiting of the AC switch. A voltage detection circuit 30 is constituted with the use of a microprocessor (MPU) 320 having a built-in A/D converter 325.

Here, a rectified and smoothed out DC voltage between the terminals 510 and 520 is input to the A/D converter 325 through the a voltage divider formed of resistors 311 and 312, and periodically A/D conversion is performed in order to be checked by the MPU 320 whether the output DC voltage reaches predetermined upper or lower limit value, for example, 6 V (lower limit) or 8 V (upper limit).

When the DC output voltage reaches 8 V, the MPU 320 makes the control output 326 be in the "H" level to make the AC switch 20 ON through logical gates 340 and 350, and terminals 125 and 126 of the secondary winding of the current transformer 10 are short-circuited. Then, the input from the current transformer 10 is cutoff, and the charge in the capacitor 450 is supplied to the load 500 and the output voltage decreases. When the voltage at the terminal 520 reaches 6 V (lower limit voltage), it is detected by the MPU 335 through A/D converter 325 and the control output 326 is turned to "L" level to turn off the AC switch 20, whereby the secondary winding of the current transformer 10 resumes supply of power.

In the present embodiment, since the output DC voltage is checked and judged by the software in the MPU 320, there is a possibility that a delay may occur due to a sudden increase in the current in the current transformer and in that period of delay, the DC power supply apparatus may have an excess input, leading to the increased circuit loss. Therefore, as a measure for such a case, ahead of the output of the MPU 320, a control signal is sent to the logical gate 340 in a manner of feed-forward through a diode 258 for a bypass and a zener diode 335, and then the signal makes the AC switch 20 conductive to short-circuit the secondary winding 120 of the current transformer 10.

In the present embodiment, since the AC switch 20 is constituted with only two MOS field effect transistors 211 and 212, and further these transistors also constitute the rectifier circuit 25, the circuit configuration is simplified. The secondary winding has a constitution to be short-circuited between the center-tap and both terminals, so that the ON-resistance of the MOS field effect transistors 211 and 212 can be a little higher than the case where the secondary winding has no center-tap. Hence, the apparatus can be constituted at a low cost. And the voltage control with the use of the A/D converter 325 and the MPU 320, can be highly controlled.

Hence, the power supply apparatus of a current transformer input type according to the present invention comprises an AC switch connected to the current transformer in parallel to a secondary winding thereof, the AC switch including a switch of a low ON-resistance which gives no offset voltage at a current-buildup, wherein the apparatus is constituted so that the excess input of the current transformer can be detected, and the secondary voltage of the current transformer is properly short-circuited, whereby the input power is made practically zero. Therefore, a current transformer can be downsized and the circuit loss is made minimum.

Although the invention has been described above in connection with exemplary embodiments, it is apparent that many modifications and substitutions can be made without departing from the spirit or scope of the invention. For instance, there can be further modifications among the AC switch, the rectifier circuit, the voltage detection circuit and the control circuit. The charge accumulation element is not limited to an ordinary electrolytic capacitor, but in a case where the capacity of a load is large, a double layer type capacitor may be used, and a switching type power supply may be used in place of a three terminal type power supply. Accordingly, the invention is not to be considered as limited by the foregoing description, but is only limited by the scope of the appended claims.

What is claimed as new and desired to be protected by Letters Patent of the United States is:

1. A power supply apparatus comprising:
a voltage detection circuit connected to an output side of a smoothing circuit and an input side of an AC switch said smoothing circuit having a DC voltage supplied thereto;
said AC switch having a low ON-resistance with no offset voltage at current-buildup and further connected to a secondary winding of a current transformer; and
wherein when an output voltage of said smoothing circuit increases up to a predetermined value said output voltage is detected by said voltage detection circuit and said AC switch is turned on by an output signal of said voltage detection circuit whereby said secondary winding of said current transformer is short-circuited.

2. The apparatus of claim 1 wherein said AC switch comprises field effect transistors.

3. The apparatus of claim 2 further comprising a rectifier circuit comprising parasitic diodes of said field effect transistors.

4. The apparatus of claim 1 wherein said AC switch comprises a mercury contact relay.

5. The apparatus of claim 1 wherein a control signal of said AC switch is formed by a DC power supply of said smoothing circuit.

6. The apparatus of claim 1 wherein said apparatus is a current transformer input type.

7. The apparatus of claim 1 wherein said voltage detection circuit is hysteretic.

8. The apparatus of claim 1 wherein said AC switch is connected to said secondary winding in parallel.

9. The apparatus of claim 1 wherein said ON-resistance is about 2 mΩ to about 10 mΩ.

10. A power supply apparatus comprising:
a voltage detection circuit connected to a smoothing circuit and an AC switch having a low ON-resistance with no offset voltage at current-buildup and further connected to a secondary winding of a current transformer wherein when an output voltage of said smoothing circuit increases up to a predetermined value said output voltage is detected by said voltage detection circuit and said AC switch is turned on by an output signal of said voltage detection circuit whereby said secondary winding of said current transformer is short-circuited.

11. The apparatus of claim 10 wherein said AC switch comprises field effect transistors.

12. The apparatus of claim 11 further comprising a rectifier circuit comprising parasitic diodes of said field effect transistors.

13. The apparatus of claim 10 wherein said AC switch comprises a mercury contact relay.

14. The apparatus of claim 10 wherein a control signal of said AC switch is formed by a DC power supply of said smoothing circuit.

15. The apparatus of claim 10 wherein said apparatus is a current transformer input type.

16. The apparatus of claim 10 wherein said voltage detection circuit is hysteretic.

17. The apparatus of claim 10 wherein said AC switch is connected to said secondary winding in parallel.

18. The apparatus of claim 10 wherein said ON-resistance is about 2 mΩ to about 10 mΩ.

19. A power supply apparatus comprising:
a voltage detection circuit connected to a smoothing circuit and an AC switch connected to a secondary winding of a current transformer wherein when an output voltage of said smoothing circuit increases up to a predetermined value said output voltage is detected by said voltage detection circuit and said AC switch is turned on by an output signal of said voltage detection circuit whereby said secondary winding of said current transformer is short-circuited.

20. The apparatus of claim 19 wherein said AC switch comprises field effect transistors.

21. The apparatus of claim 20 further comprising a rectifier circuit comprising parasitic diodes of said field effect transistors.

22. The apparatus of claim 19 wherein said AC switch comprises a mercury contact relay.

23. The apparatus of claim 19 wherein a control signal of said AC switch is formed by a DC power supply of said smoothing circuit.

24. The apparatus of claim 19 wherein said apparatus is a current transformer input type.

25. The apparatus of claim 19 wherein said voltage detection circuit is hysteretic.

26. The apparatus of claim 19 wherein said AC switch is connected to said secondary winding in parallel.

27. The apparatus of claim 19 wherein said AC switch has a low ON-resistance with no offset voltage at current-buildup.

28. The apparatus of claim 27 wherein said ON-resistance is about 2 mΩ to about 10 mΩ.

29. A method of controlling current in a power supply apparatus comprising the steps of:
providing a voltage detection circuit connected to an output side of a smoothing circuit and an input side of an AC switch said smoothing circuit having a DC voltage supplied thereto;
said AC switch having a low ON-resistance with no offset voltage at current-buildup and further connected to a secondary winding of a current transformer; and
wherein when an output voltage of said smoothing circuit increases up to a predetermined value said output voltage is detected by said voltage detection circuit and said AC switch is turned on by an output signal of said voltage detection circuit whereby said secondary winding of said current transformer is short-circuited.

30. The method of claim 29 wherein said AC switch comprises field effect transistors.

31. The method of claim 30 further comprising a rectifier circuit comprising parasitic diodes of said field effect transistors.

32. The method of claim 29 wherein said AC switch comprises a mercury contact relay.

33. The method of claim 29 wherein a control signal of said AC switch is formed by a DC power supply of said smoothing circuit.

34. The method of claim 29 wherein said apparatus is a current transformer input type.

35. The method of claim 29 wherein said voltage detection circuit is hysteretic.

36. The method of claim 29 wherein said AC switch is connected to said secondary winding in parallel.

37. The method of claim 29 wherein said ON-resistance is about 2 mΩ to about 10 mΩ.

38. A method of controlling current in a power supply apparatus comprising the steps of:
providing a voltage detection circuit connected to a smoothing circuit and an AC switch having a low ON-resistance with no offset voltage at current-buildup and further connected to a secondary winding of a current transformer wherein when an output voltage of said smoothing circuit increases up to a predetermined value said output voltage is detected by said voltage detection circuit and said AC switch is turned on by an output signal of said voltage detection circuit whereby said secondary winding of said current transformer is short-circuited.

39. The method of claim 38 wherein said AC switch comprises field effect transistors.

40. The method of claim 39 further comprising a rectifier circuit comprising parasitic diodes of said field effect transistors.

41. The method of claim 38 wherein said AC switch comprises a mercury contact relay.

42. The method of claim 38 wherein a control signal of said AC switch is formed by a DC power supply of said smoothing circuit.

43. The method of claim 38 wherein said apparatus is a current transformer input type.

44. The method of claim 38 wherein said voltage detection circuit is hysteretic.

45. The method of claim 38 wherein said AC switch is connected to said secondary winding in parallel.

46. The method of claim 38 wherein said ON-resistance is about 2 mΩ to about 10 mΩ.

47. A method of controlling current in a power supply apparatus comprising the steps of:
providing a voltage detection circuit connected to a smoothing circuit and an AC switch connected to a secondary winding of a current transformer wherein when an output voltage of said smoothing circuit increases up to a predetermined value said output voltage is detected by said voltage detection circuit and said AC switch is turned on by an output signal of said voltage detection circuit whereby said secondary winding of said current transformer is short-circuited.

48. The method of claim 47 wherein said AC switch comprises field effect transistors.

49. The method of claim 48 further comprising a rectifier circuit comprising parasitic diodes of said field effect transistors.

50. The method of claim 47 wherein said AC switch comprises a mercury contact relay.

51. The method of claim 47 wherein a control signal of said AC switch is formed by a DC power supply of said smoothing circuit.

52. The method of claim 47 wherein said apparatus is a current transformer input type.

53. The method of claim 47 wherein said voltage detection circuit is hysteretic.

54. The method of claim 47 wherein said AC switch is connected to said secondary winding in parallel.

55. The method of claim 47 wherein said AC switch has a low ON-Hitachi resistance with no offset voltage at current-buildup.

56. The method of claim 55 wherein said ON-resistance is about 2 mΩ to about 10 mΩ.

* * * * *